United States Patent Office 3,104,202
Patented Sept. 17, 1963

---

3,104,202
INHALATION ANESTHETIC: 2,2-DICHLORO-1,1-DIFLUOROETHYL METHYL ETHER
Eric R. Larsen, Midland, Mich., assignor to The Dow Chemical Company, Midland, Mich., a corporation of Delaware
No Drawing. Original application July 29, 1959, Ser. No. 830,207. Divided and this application Aug. 30, 1961, Ser. No. 134,869
4 Claims. (Cl. 167—52)

This invention relates to a process for the use of stable 2,2-dichloro-1,1-difluoroethyl methyl ether as a general inhalation anesthetic.

This application is a division and a continuation-in-part of application Serial No. 830,207, filed in the Patent Office July 29, 1959, which in turn is a continuation-in-part of application Serial No. 803,818, filed in the Patent Office April 3, 1959, now abandoned.

These copending applications disclose methods for purifying and stabilizing 2,2-dichloro-1,1-difluoroethyl methyl ether.

2,2-dichloro-1,1-difluoroethyl methyl ether has outstanding utility as a general inhalation anesthetic when administered to inhalation-anesthetic-susceptible organisms.

The physiological effects of 2,2-dichloro-1,1-difluoroethyl methyl ether upon dogs were demonstrated in the following manner:

Two to three cubic centimeters of the stabilized ether were vaporized by passing oxygen over the surface of the ether and the resulting mixture administered to a normal, conscious dog by means of a common inhalation mask and anesthetic machine, in a procedure identical to human anesthetic inhalation procedure. Systemic arterial blood pressures were recorded in the usual manner. Following the initial dose of 2,2-dichloro-1,1-difluoroethyl methyl ether, an additional 9 to 10 cubic centimeters were administered over a period of about 55 minutes which maintained a clinically satisfactory state of anesthesia varying from moderate to deep; electroencephalographic tracings showed only slight changes in the electromotive potential measurements of the brain; electroencephalographic data reflected a normal sinus rhythm with an auricular-ventricular block common to anesthetic effects; and the blood pressure was normal under existing circumstances.

All of the foregoing physiological and anesthetic effects are considered to be substantially normal and typical of anesthetic administration, closely paralleling the results occurring from the widely used anesthetic, diethyl ether. In addition, however, 2,2-dichloro-1,1-difluoroethyl methyl ether has the added beneficial feature of being noncombustible under temperatures usually existing during anesthetic operations.

Likewise, the vapor pressure of the subject ether is sufficiently high to produce deep anesthesia, but yet not high enough to permit possibility of overdosage. Thus during the foregoing experiments with dogs, the vaporizer was allowed to remain fully opened throughout all phases of inhalation without overdosage occurring as would be expected with the present general anesthetics administered by means of inhalation. Vaporization took place in the presence of oxygen; however, 2,2-dichloro-1,1-difluoroethyl methyl ether may be vaporized with equal facility in the presence of a gaseous vaporization medium such as nitrogen, helium, carbon dioxide, air or other innocuous gases generally utilized in anesthetic vaporization techniques.

While the foregoing description has been directed to dogs, it is to be understood that the 2,2-dichloro-1,1-difluoroethyl methyl ether may be used with equal facility on other inhalation-anesthetic-susceptible organisms.

Various modifications may be made in the present invention without departing from the spirit or scope thereof, and it is to be understood that I limit myself only as defined in the appended claims.

I claim:

1. The process which comprises administering 2,2-dichloro-1,1-difluoroethyl methyl ether as a general inhalation anesthetic.

2. The process which comprises administering 2,2-dichloro-1,1-difluoroethyl methyl ether to an inhalation-anesthetic-susceptible organism, as a general inhalation anesthetic.

3. The process which comprises administering 2,2-dichloro-1,1-difluoroethyl methyl ether to an inhalation-anesthetic-susceptible organism, as a general inhalation anesthetic by vaporization of the said ether in the presence of an innocuous gas vaporization medium.

4. The process which comprises administering 2,2-dichloro-1,1-difluoroethyl methyl ether to an inhalation-anesthetic-susceptible organism in admixture with oxygen, by vaporization of the said 2,2-dichloro-1,1-difluoroethyl methyl ether in the presence of oxygen, thereby to anesthetize said organism.

References Cited in the file of this patent

Miller: J. Am. Chem. Soc., volume 70, page 432, January 1948.

Robbins: J. of Pharm. and Exper. Therap., volume 86, pages 197–204, 1946.